United States Patent [19]

Falzoni

[11] Patent Number: 4,752,278
[45] Date of Patent: Jun. 21, 1988

[54] MANUALLY-OPERATED CONTROL DEVICE FOR A MOTOR VEHICLE GEARBOX COMPRISING A VARIATOR

[75] Inventor: Gianluigi Falzoni, Turin, Italy

[73] Assignee: Fiat Auto S.p.A., Turin, Italy

[21] Appl. No.: 3,347

[22] Filed: Jan. 14, 1987

[30] Foreign Application Priority Data

Jan. 14, 1986 [IT] Italy ................................ 67026-A/86

[51] Int. Cl.$^4$ ............................................. F16H 11/04
[52] U.S. Cl. .......................................... 474/28; 74/868
[58] Field of Search ............... 474/28, 18, 29; 74/868, 74/869, 867

[56] References Cited

U.S. PATENT DOCUMENTS 3,043,152  7/1962  Karig et al. ........................... 474/18
3,200,666  8/1965  Schrodt et al. ..................... 474/28 X
4,161,894  7/1979  Giacosa ............................. 474/28 X
4,627,313 12/1986  Sakai ................................. 474/28 X
4,671,140  6/1987  Koshio ............................... 474/18 X Primary Examiner—Stephen J. Novosad
Assistant Examiner—Thuy M. Bui
Attorney, Agent, or Firm—Sughrue, Mion, Zinn, Macpeak, and Seas

[57] ABSTRACT

The device enables the control of a gearbox comprising a continuous variator with two hydraulically-controlled pulleys, primary and secondary, of expanding type. The device comprises a hydraulic control unit with a supply inlet for connection to a source of hydraulic fluid, and first and second control outlets for connection to the primary and secondary pulleys of the variator. The hydraulic unit includes a manually-operated control member. In dependence on the position of the control member, the hydraulic unit supplies varying amounts of pressurized hydraulic fluid to the primary and secondary pulleys of the variator, producing a different transmission ratio.

6 Claims, 1 Drawing Sheet

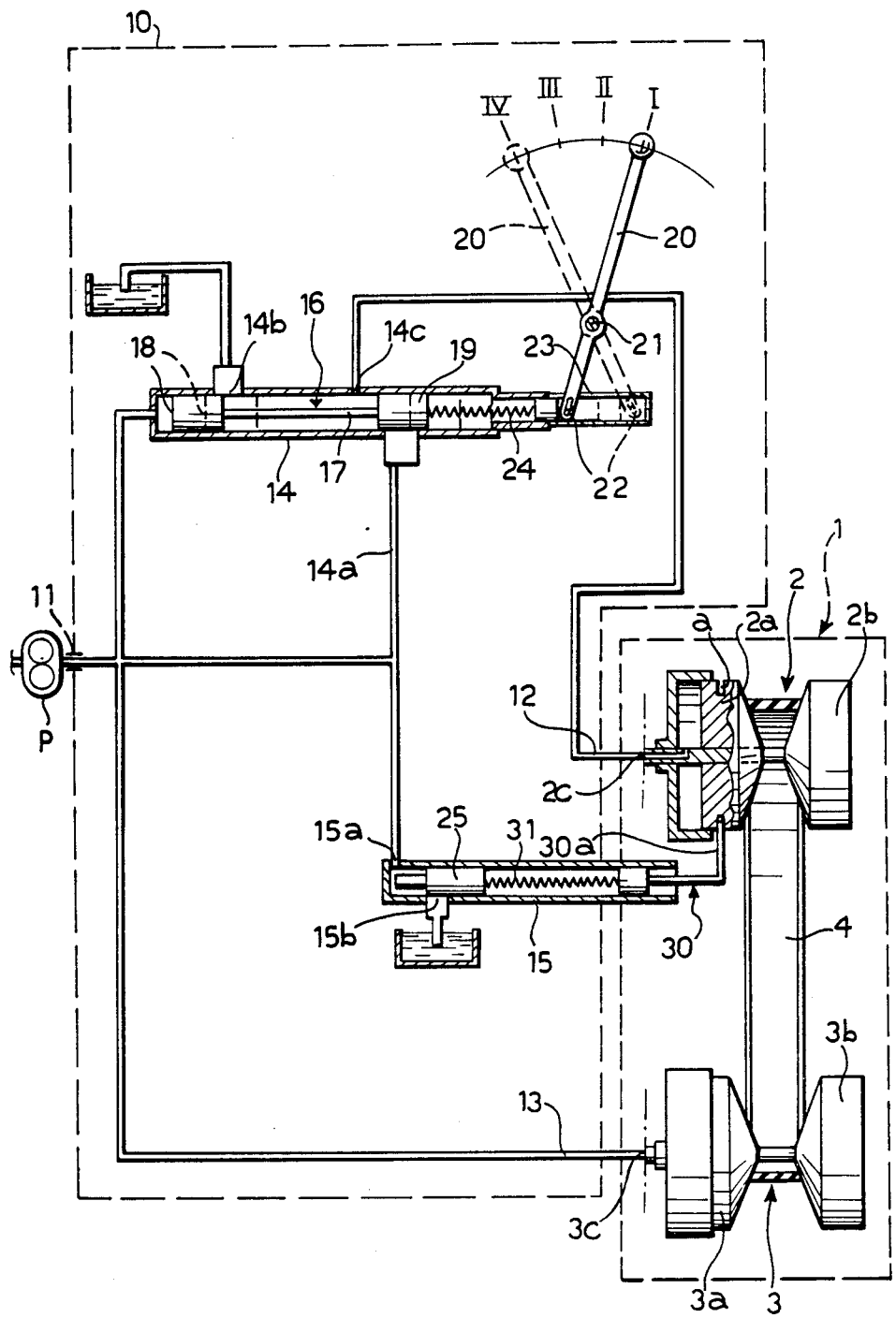

MANUALLY-OPERATED CONTROL DEVICE FOR A MOTOR VEHICLE GEARBOX COMPRISING A VARIATOR

The present invention relates to a control device for a motor vehicle gearbox comprising a continuous variator of the type including two hydraulically-controlled expansible pulleys, primary and secondary respectively, coupled by a belt.

This type of continuous variator is well known, and is typically used in automatic stepless gearboxes.

The object of the present invention is to provide a device which allows the manual control of a motor vehicle gearbox of the type defined above, that is, comprising a continuous variator.

This object is achieved according to the invention by means of a control device, characterised in that it comprises a hydraulic control unit having a supply inlet for connection to a source of hydraulic fluid, and first and second control outlets for connection to the primary and secondary pulleys of the variator respectively; the hydraulic unit comprising control valve means able to assume first and second conditions in which they couple the inlet respectively to the first and second control outlets to supply pressurised hydraulic fluid respectively to the primary pulley and the secondary pulley in such a manner as to produce, by means of the variator, first and second transmission ratios respectively, of which the first is smaller than the second; the hydraulic unit including a manually-operated control member for making the valve means assume the first and second conditions and a plurality of intermediate conditions in which the valve means supply varying amounts of pressurised hydraulic fluid to the first and second control outlets in such a manner as to produce, by means of the variator, corresponding transmission ratios between the first and second values.

Further characteristics and advantages of the control device according to the invention will become apparent from the detailed description which follows with reference to the attached drawing which illustrates a device according to the invention diagrammatically.

In the drawing, a continuous variator of V-belt type is generally indicated 1. This comprises, in known manner, a primary pulley 2 and a secondary pulley 3 coupled together by means of transmission V-belt 4. The pulleys 2 and 3 can expand axially and comprise respective pairs of conical rotors 2a, 2b and 3a, 3b which face each other and are co-axial.

In known manner, each of the rotors 2a and 3a can be moved axially towards the respective facing rotor by means of the supply of pressurised hydraulic fluid to an inlet 2c, 3c of the corresponding pulley.

The control device according to the invention includes a hydraulic control unit, generally indicated 10, having a supply inlet 11 for connection to a source of hydraulic fluid, for example a pump P, and two outlets 12 and 13 connected to the control inlets of the pulleys 2 and 3 of the variator 1.

The primary valve 14 has an inlet 14a connected to the inlet 11 of the unit 10, a discharge outlet 14b, and a control outlet 14c connected to the control inlet 2c of the pulley 2 through the outlet 12 of the hydraulic unit 10.

A distributor member 16 is movably mounted in the primary valve 14 and, in the embodiment illustrated as an example, comprises a stem 17 provided with two end heads 18 and 19.

A manually-operable lever member 20 is pivoted at 21 and a pusher member 22 movable in guided manner at 23 is articulated to its lower end. Between the member 22 and the distributor member 16 is interposed a stiff spring 24.

By means of the lever 20, the distributor 16 of the primary valve 14 can be moved between a first position (illustrated in full outline) in which it closes the inlet 14a and puts the control part 14c into communication with the discahrge port 14b, and a second position (illustrated in broken outline) in which the distributor closes the discharge port 14b and connects the inlet 14a to the control outlet 14c. The positions of the lever 20 indicated by I and IV in the drawing correspond to these extreme positions of the distributor member. The lever 20 can assume a plurality of other intermediate positions between these positions, for example the positions indicated II and III in the drawing, in correspondence with which the distributor 16 established variable degrees of communication between the inlet 14a and the control outlet 14c.

The lever 20 is suitably provided with retaining means 20' for holding it in the said positions.

The secondary valve 15 has an inlet 15a connected to the delivery of the pump P, and a discharge port 15b. The valve includes a shutter 25 movable between first and second positions in which it substantially prevents and permits communication between the inlet and discharge, respectively. The position of the shutter 25 is made variable in dependence on the transmission ratio produced by the variator 1. This is achieved in the illustrated example by making the position of the shutter 25 dependent on the position of the axially movable rotor 2a of the primary pulley 2. In the example illustrated, the rotor 2a has a circumferential groove, indicated a, into which extends the end of a rod 30a of a sensor member 30 movable with the rotor 2a of the primary pulley 2. The sensor member 30 of the illustrated example is coupled to the shutter 25 by means of a rigid spring 31.

The above-illustrated device operates as follows:

With the control valve in position I, for example, the control inlet 2c of the primary pulley 2 is connected to the discharge by means of the primary valve 14, and the secondary valve 15 is substantially closed. The hydraulic fluid supplied by the pump P reaches the inlet 3c of the secondary pulley, the groove width of which is reduced. The primary pulley 2 expands by the corresponding amount.

Under such conditions the variator 1 produces a low transmission ratio.

When the control lever 20 is moved to position IV, the primary valve connects the delivery of the pump P to the control inlet 2c of the primary pulley. The axial extent of the pulley is reduced as a result of the displacement of the movable rotor 2a towards the rotor 2b. Such a displacement involves a corresponding displacement of the shutter 25 of the secondary valve 15. The secondary pulley 3 is therefore placed in hydraulic communication with the discharge through the secondary valve 15. Thus, in correspondence with the moving together of the rotors of the primary pulley 2, there is an equivalent moving apart of the rotors of secondary pulley 3.

Under such conditions the variator 1 produces a high transmission ratio.

From the foregoing, it is clear that, when the control lever 20 is moved to positions intermediate the positions I and IV, the variator produces transmission ratios having values intermediate the values produced in these extreme positions.

I claim:

1. A control device for a motor vehicle gearbox comprising a continuous variator including two hydraulically-controlled expansible pulleys, primary and secondary respectively, coupled by a belt, a hydraulic control unit having a supply inlet for connection to a source of hydraulic fluid, and first and second control outlets for connection to the primary and secondary pulleys of the variator respectively; the hydraulic unit comprising control valve means, able to assume first and second conditions in which they couple the inlet respectively to first and second control outlets to supply pressurized hydraulic fluid respectively to the primary pulley and the secondary pulley in such a manner as to produce, by means of the variator, first and second transmission ratios respectively, of which the first is smaller than the second; the hydraulic unit including a manually operated control member for making the valve means assume the first and second conditions and a plurality of intermediate conditions in which the valve means supply varying amounts of pressurized hydraulic fluid to the first and second control outlets in such a manner as to produce, by means of the variator, corresponding transmission ratios between the first and second valves and retaining means for holding the control member in each of a plurality of positions corresponding to said conditions respectively.

2. A device according to claim 1, wherein the valve means comprise a primary valve having an inlet connected to the inlet of the hydraulic unit, a discharge port, and a control port constituting the first outlet of the hydraulic control unit; the primary valve including a distributor member which, by means of a manually-operated control member, can be moved between a first position in which it closes the inlet and connects the control port to the discharge port, and a second position in which it closes the discharge port and connects the inlet to the control port; the distributor member connecting the inlet of the primary valve to the control port to varying extents in positions intermediate the first and second positions.

3. A device according to claim 2, wherein the inlet of the hydraulic unit is coupled directly to the secondary pulley of the variator; the valve means including a secondary valve having an inlet connected to the inlet of the hydraulic unit, and a discharge port; the secondary valve including a shutter member movable between first and second positions in which it substantially prevents and permits communication between the inlet and the discharge of the secondary valve respectively; the shutter member connecting the inlet of the secondary valve to the discharge port to varying extents in positions intermediate the first and second positions.

4. A device according to claim 3, wherein sensor means for sensing the transmission ratio produced by the variator are associaed with the secondary valve, so as to cause a variation in the position of the shutter member of the secondary valve in dependence on the transmission ratio detected.

5. A device according to claim 2, wherein the sensor means comprise means for detecting the variator.

6. A device according to claim 5, wherein the sensor means comprise means for detecting the variations in the axial width of the groove of the primary pulley of the variator.

* * * * *